United States Patent
Parry

[11] Patent Number: 5,603,854
[45] Date of Patent: Feb. 18, 1997

[54] SPATTER REDUCTION TECHNIQUE

[75] Inventor: Alan Parry, Lobethal, Australia

[73] Assignee: Otavius Pty Ltd., Adelaide, Australia

[21] Appl. No.: 446,649

[22] PCT Filed: Nov. 24, 1993

[86] PCT No.: PCT/AU93/00596

§ 371 Date: Jul. 13, 1995

§ 102(e) Date: Jul. 13, 1995

[87] PCT Pub. No.: WO94/12312

PCT Pub. Date: Jun. 9, 1994

[30] Foreign Application Priority Data

Nov. 24, 1992 [AU] Australia .................... PL6007

[51] Int. Cl.$^6$ ............................................ B23K 9/00
[52] U.S. Cl. .................. 219/137 R; 219/74; 219/136; 219/137.43
[58] Field of Search .................. 219/136, 137 R, 219/137.43, 74

[56] References Cited

U.S. PATENT DOCUMENTS 1,963,729  6/1934  Alexay .
3,586,818  6/1971  Blake .
4,609,804  9/1986  Kishi et al. ............ 219/137.43
5,278,392  1/1994  Takacs ................... 219/137.43

FOREIGN PATENT DOCUMENTS 2140274   2/1973  Germany .
60-3983   1/1985  Japan .................... 219/137.43
WO91/11286 8/1991  WIPO .

OTHER PUBLICATIONS

Derwent Abstract Accession No. 91–279041/38, SU, A, 1600939 Troepolskii V N) 23 Oct. 1990 (23. 10. 90).
Derwent Soviet Inventions Illustrated, Section 1, Chemical, Issued Aug. 1970, Metallurgy, p. 59, SU 260369 (Petrunin et al) 20 May 1970 (20. 05. 70) abstract.
Derwent Soviet Inventions Illustrated, Section 1, Chemical, Issued Dec. 1967, Metallurgy, p. 2, SU 192316 (Troepolskii et al.) 12 Apr. 1967 (12. 04. 67) abstract.

Primary Examiner—Clifford C. Shaw

[57] ABSTRACT

A method of metal-inert-gas arc welding which reduces spatter in the welding process, wherein a liquid (8), preferably a hydrocarbon, is dispersed in the inert gas during the welding process. At a weld site (2), the use of the liquid (8) dispersed in the gas prevents any spatter formed from adhering to any surface adjacent the welding hand piece (3). The liquid may be dispersed in the gas by passing the gas through the liquid in a container (7) located between the gas supply (12, 13) and the welding hand piece (3), or may be injected into the gas as a vapor or free mist.

16 Claims, 2 Drawing Sheets

5,603,854

SPATTER REDUCTION TECHNIQUE

TECHNICAL FIELD

The invention relates to me metal-inert gas (MIG) arm welding process in which an inert gas is directed around an electrode while effecting arc welding.

BACKGROUND ART

The problem to which this invention is directed relates to build up of spatter during the welding process.

Conventionally, spatter will collect and adhere on all of parts adjacent a welding arc apparatus including a gas cowl and the nozzle through which the continuously feeding metal rod is being directed. Such spatter will build up to interfere with both the welding process and the free exiting of either the consumable metal rod or the free flow of the inert gas.

Many attempts have been made to overcome this problem. The problem is especially serious where this type of welding is used as a part of a robotic welding process so that it becomes very difficult to know when spatter has reduced the welding efficiency and the component parts have to be removed for cleaning.

DISCLOSURE OF THE INVENTION

I have found a technique which reduces these difficulties with spatter which will be useful for all welding applications where an inert gas is used to blanket an electric arc.

In one form this invention can be said to reside in the method of injecting into an inert gas as it is being supplied to the welding head during the welding process, a liquid selected so that when this substance reaches the weld site it will have the capability to reduce the capacity for any spatter being formed to adhere to adjacent materials.

In preference, the spatter retardant liquid material is injected so that it is substantially dispersed within the inert gas such that it will exit with the inert gas during the welding process.

In a preferred embodiment of the present invention, inert gas is introduced into a reservoir of the spatter retardant liquid and bubbled through the liquid thereby forming a dispersion or fine mist of the spatter retardant liquid in the inert gas. This method of injecting the spatter retardant liquid into the inert gas is particularly preferred because it appears that only a sufficient quantity of spatter retardant liquid is introduced into the inert gas, thereby avoiding any problems which can occur when an excessive quantity of the liquid is introduced into the inert gas.

The spatter retardant liquid that has been found to be particularly advantageous in this application comprises a mixture of one or more hydrocarbon liquids, preferably a petroleum distillate. In trials material produced by distillation within the range of 250° C. to 400° C. has been found to be suitable. The material commonly available under the name "diesel fuel" is an example of a material suitable for use in the spatter reduction technique of the present invention.

The injection of the spatter retardant liquid into the gas can be achieved by other means, for example, in several trials, I injected a very small quantity of diesel fuel in distributed manner into the gas supply of a MIG welder using a conventionally available device known as a lubricator. This was a prep-air airline lubricator of a type that is conventionally available in engineering and which allows a diesel fuel drip to be injected into the gas line at a rate proportional to the volume of inert gas passing through it, giving a smooth flow of diesel via a combination ball check and metering of valve which automatically adjusts diesel feed according to gas demands from downstream.

A supply of diesel fuel can be kept in a filled bowl with an adjustment allowing for change of the feed rate which is adjusted for each application but once set is constant through the period of an application.

My trials so far have indicated that by the introduction of small quantities of diesel fuel into the gas line in the manner described there results an welding in which spatter simply does not appear to build up at all on the adjacent metal parts of the welding torch.

The gas that I have used this with in the example is argon.

The invention can also reside in the method of welding which comprises the steps of introducing the spatter retardant liquid into the inert gas line during the welding process.

Alternatively, the invention can reside in a welding apparatus comprising an inert gas welding system Including an inert gas supply, and means in-line to introduce a selected spatter retardant liquid during the welding process.

Preferably, the source of the spatter retardant liquid is a sealed container disposed between the inert gas supply means and the welding hand piece, and in which the inert gas passes through an inlet into the container and through the spatter retardant liquid in bubble form, the inert gas collecting in a space above the surface of the liquid, a portion of the spatter retardant liquid being entrained in the inert gas as a dispersion or a fine mist, the inert gas and entrained gas being subsequently delivered to a weld site through the welding hand piece. While it is most convenient to introduce the spatter retardant material in the gas line, it would be appear to be possible to introduce the liquid in dispersed form in the vicinity of the outlet head other than in-line if necessary in that this would have the same effect but it would appear to be somewhat more awkward to introduce in this location.

One of the advantages of the arrangement described is that it can be provided on an ongoing continuous basis so that down time from spatter build-up can be significantly reduced.

BRIEF DESCRIPTION OF THE DRAWINGS

For a better understanding of the invention it will now be described with the assistance of drawings in which.

BEST MODE FOR CARRYING OUT THE INVENTION

Figure 1:
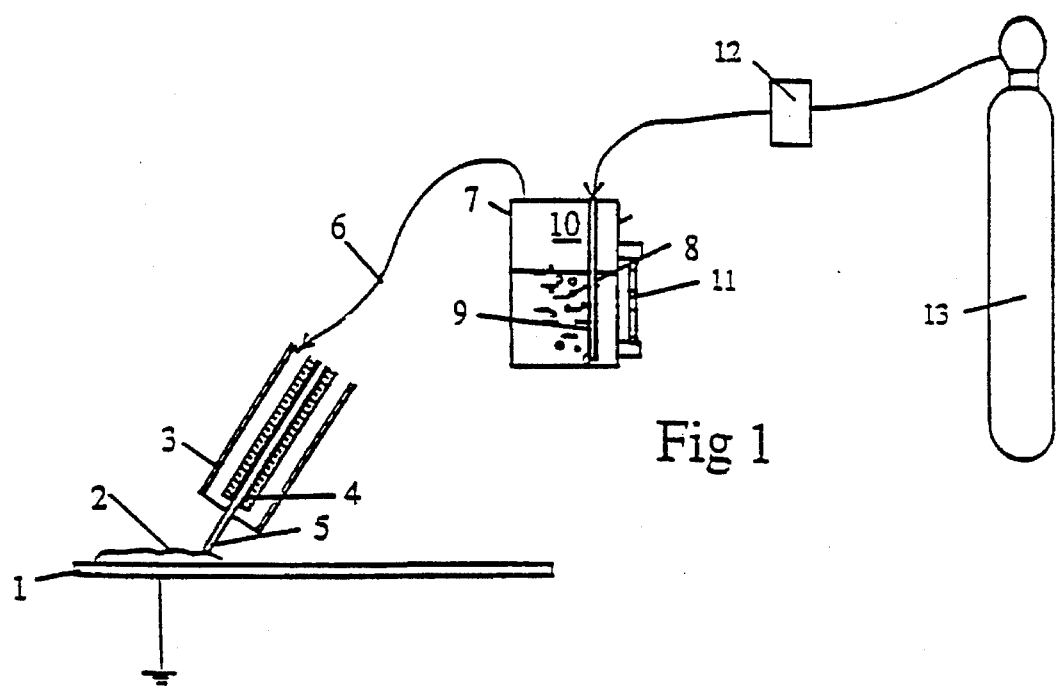
FIG. 1 shows in schematic outline the apparatus according a first embodiment of the present invention.

Referring to FIG 1 there is a work piece 1 on which a weld 2 is being formed.

A MIG handpiece includes a cowl 3 for directing gas around the nozzle 4 and the metal welding rod 5. The metal rod 5 is fed through the nozzle 4 by drive means (not shown) and is consumed during the welding process.

An inert gas supply is provided through conduit 6 from a sealed container 7 in which there is a reservoir of the spatter retardant liquid used for the method. The liquid is chosen for its effectiveness so that it will be capable of forming a mist and therefore be able to be transferred in a stable form to an outlet of the handpiece.

The material used in this instance is a liquid containing petroleum distillate, mineral oil and corrosion inhibitors. Such a material is available from CRC Chemicals Australia Pty Ltd, its characteristics being those set out hereunder, namely;

| | |
|---|---|
| Appearance and Odour: | Green liquid, pleasant odour |
| Boiling point/melting point: | 193 C. (initial) |
| Vapour Pressure: | 0.23 mm Hg |
| Percent Volatiles: | 82% w/w |
| Specific gravity: | 0.81 @ 25 C. |
| Flash point: | 79 C. coc |
| Flammability limits: | LEL: 1.4% UEL: 12% |
| Autoignition temperature: | 550 C. |
| Solubility: | Negligible in water, dissolves in most organic solvents |
| Evaporation Rate: | 0.05 (n Butyl Acetate = 1) |
| Vapour density: | Heavier than air |
| Freezing point: | N/A |

With spatter retardant liquid in the chamber, there is a gas inlet directed through inlet tube 9 such that the gas will issue in bubble form and therefore cause some splashing and vapourisation so that this is collected in space 10 above the level of the liquid 8.

An external level indicator 11 is supplied through control valve 12 and this in turn is supplied from a gas regulator connected to a gas supply bottle at 13.

The result has been that spatter has not continued to stick on the respective metal parts in the adjacent vicinity of the welding arc with enormous advantage to industrial processes.

It is assumed that the spatter retardant liquid coats the adjacent surfaces such as the nozzle 4 and the cowl 3, which coming, in the vicinity of an oxygen excluding gas, will not readily burn and therefore will act to effect an interface surface which will be only slowly vapourised in the vicinity of the general heat of the world but will be rapidly vapourised when hit by spatter.

Such rapid vapourisation would appear to effect a retardation of any sticking of the spatter on the adjacent parts.

The rate of providing of the liquid would in this case be sufficient to replace the coating as it is vapourised with the slower radiant heat from the arc.

Figure 2:
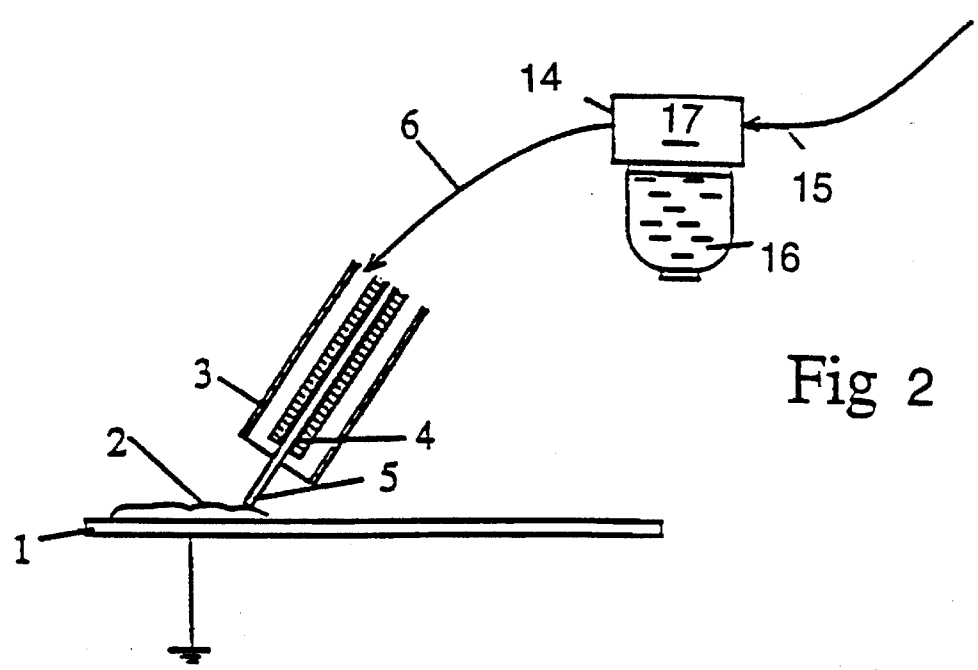
FIG. 2 illustrates an apparatus in accordance with a second aspect of the present invention.

FIG. 2 illustrates a second embodiment of the present invention. The arrangement depicted in FIG. 2 shares many common features with the embodiment of FIG. 1 and like parts have been given like numerals.

Shown in the drawing is a workpiece 1 in which a weld is being formed. An MIG hand piece includes a cowl 3 for directing gas around a nozzle 4 and a metal welding rod 5. The welding rod 5 is fed through the nozzle 4 by drive means (not shown) and is consumed during the welding process.

An inert gas supply is provided through conduit 6 from an in-line liquid distributor 14, The liquid distributor 14 receives an on demand supply of gas through conduit 15. The spatter retardant liquid 16 comprises diesel fuel and is held in a bowl in the distributor 14. Through an adjustable setting of the head 17 controls the distribution of the liquid in a dispersed manner into the gas.

Materials that could be selected therefore will provide a lower volatility or flash point, will generally not cause obnoxious fumes either to the welder or to the environment or to the workpiece and obviously will be relatively economic to provide.

Also, it is preferable that the material can be introduced and be maintained within the gas line and not acceptably interact with the inert gas to the detriment of the arc process.

Materials offer than diesel fuel therefore can be selected having these characteristics and other oil or petroleum distillates may be suitable.

Throughout this specification the purpose has been to illustrate the invention and not to limit this. It is considered for instance it could apply to tungsten inert gas welding as well as any offer system where any inert gas is used in an arc welding process and in which spatter has otherwise been a problem.

Selected hydrocarbon materials can provide when introduced in the vicinity of the weld a reduction of the ability of spatter to stick and to the extent that there are other compounds and materials which provide this purpose, the invention is directed to introducing these in liquid form into the gas.

I claim:

1. A method of reducing the effect of spatter in a welding process, including the step of injecting a spatter retardant liquid into an inert gas to be used during a metal-inert gas welding process, the liquid forming a dispersion in the inert gas.

2. A method of reducing the effect of spatter according to claim 1, whereby at a weld site spatter formed during the process has a reduced tendency to adhere to surfaces adjacent a welding hand piece.

3. A method of reducing the effect of spatter according to claim 1, in which the spatter retardant liquid is dispersed in the gas as a vapour and exits the welding hand piece with the inert gas.

4. A method of reducing the effect of spatter according to claim 1, in which the spatter retardant liquid is dispersed in the inert gas as a fine mist.

5. A method of reducing the effect of spatter according claim 1, in which the spatter retardant liquid is a mixture of one or more hydrocarbon liquids.

6. A method of reducing the effect of spatter according to claim 5, in which the spatter retardant liquid is a petroleum distillate with a boiling point in the range 250–400 C.

7. A method of reducing the effect of spatter according to claim 1, in which the spatter retardant liquid additionally contains mineral oil and corrosion inhibitors.

8. A method of reducing the effect of spatter according to claim 1, in which the spatter retardant liquid is introduced into the inert gas by passing the Inert gas through me spatter retardant liquid thereby entraining a portion of the spatter retardant liquid in the inert gas as a fine mist or vapour.

9. A method of reducing the effect of spatter according to claim 1, in which the spatter retardant liquid is introduced into the inert gas using a prep-air airline lubricator to inject a constant flow of liquid into the inert gas.

10. A method of metal-inert gas welding comprising the steps of:

introducing inert gas into a reservoir of spatter retardant liquid to form a dispersion of the spatter retardant liquid in the inert gas;

directing the inert gas with dispersion spatter retardant liquid through a cowl around a nozzle to a workpiece; and feeding a welding rod through the nozzle to form a weld on the workpiece.

11. A method of metal-inert gas welding according to claim 10, in which the spatter retardant liquid is a mixture of one or more hydrocarbons.

12. A method of metal-inert gas welding according to claim 11, in which the liquid additionally contains mineral oil and corrosion inhibitors.

13. A method of metal-inert gas welding according to claim 10, in which the spatter retardant liquid is dispersed in the inert gas as a vapour.

14. A method of metal-inert gas welding according to claim 10, in which the spatter retardant liquid is dispersed in the inert gas as a fine mist.

15. An apparatus for metal-inert gas welding, including, an inert gas supply means connected to a welding hand piece, a source of spatter retardant liquid, means for introducing the spatter retardant liquid into the inert gas so as to deliver a mixture of spatter retardant liquid dispersed in the inert gas at a site to be welded.

16. An apparatus for metal-inert gas welding according to claim 15, in which the source of the spatter retardant liquid is a sealed container disposed between the inert gas supply means and the welding hand piece, and in which the inert gas is adapted to pass through an inlet into the container and through the spatter retardant liquid in bubble form, the inert gas collecting in a space above the surface of the liquid, a portion of the spatter retardant liquid being entrained in the inert gas as a dispersion or a fine mist, the inert gas and entrained gas being subsequently delivered to a weld site through the welding hand piece.

* * * * *